United States Patent [19]
Lupke et al.
[11] 4,218,164
[45] Aug. 19, 1980

[54] APPARATUS AND METHOD FOR PERFORATING TUBING

[76] Inventors: Gerd P. H. Lupke, 46 Stornoway Crescent; Manfred A. A. Lupke, 35 Ironshield Crescent, both of, Thornhill, Ontario, Canada

[21] Appl. No.: 2,757

[22] Filed: Jan. 11, 1979

Related U.S. Application Data

[63] Continuation-in-part of Ser. No. 881,417, Feb. 27, 1978, Pat. No. 4,180,357.

[30] Foreign Application Priority Data

Mar. 18, 1977 [CA] Canada ........ 274316

[51] Int. Cl.[2] ........ B26D 3/16; B29C 17/10

[52] U.S. Cl. ........ 409/131; 83/54; 83/175; 83/322; 409/179; 425/142

[58] Field of Search ........ 90/11 C, 83; 83/54, 83/175, 322, 340, 680, 830, 831, 833, 834, 853, 84, 86; 144/218; 407/66, 70, 91, 100–102, 108, 109, 114–116; 403/131, 179, 184, 199, 293, 305, 313, 317; 425/142

[56] References Cited

U.S. PATENT DOCUMENTS

| | | | |
|---|---|---|---|
| 388,900 | 9/1888 | Millett, Jr. | 142/15 |
| 3,370,491 | 2/1968 | Cross | 83/37 |
| 3,620,115 | 11/1971 | Zieg et al. | 83/54 X |
| 3,821,912 | 7/1974 | Howe | 83/54 |
| 3,910,713 | 10/1975 | Maroshak | 83/54 X |
| 3,916,763 | 11/1975 | Maroshak | 83/54 X |
| 3,957,386 | 5/1976 | Lupke | 83/54 X |
| 3,965,782 | 6/1976 | Leloux | 83/54 X |
| 4,000,672 | 1/1977 | Sitterer et al. | 83/54 X |
| 4,055,098 | 10/1977 | Leloux | 83/54 X |
| 4,112,810 | 9/1978 | Dreibelbis | 83/54 X |
| 4,158,534 | 6/1979 | Hegler et al. | 83/54 X |

FOREIGN PATENT DOCUMENTS

| | | | |
|---|---|---|---|
| 747712 | 12/1966 | Canada . | |
| 1269397 | 4/1972 | United Kingdom | 83/54 |

*Primary Examiner*—Z. R. Bilinsky
*Attorney, Agent, or Firm*—Ridout & Maybee

[57] ABSTRACT

Corrugated tubing is advanced along its axial path by rotatably driven lead screw members the screw threading of which is in meshing engagement with the corrugations of the tubing, the lead screw members being in pairs with the screw threading of the members of each pair being of opposite hand and the lead screw members each pair being rotated in opposite directions. The lead screw members of each pair present outwardly directed cutters which are synchronized substantially simultaneously to intersect the tubing thereby, in perforating the tubing, to restrain the tubing against rotation thereof about the axial path. A slide member is preferably slidably and non-rotatably mounted by a splined connection on each lead screw member with the associated cutter or cutters mounted on the slide member for rotation therewith during operative rotation of the lead screw member, the slide member being slidably moved along the lead screw member by the advancing tubing during intersection of the tubing by the associated cutter or cutters with the slide member and associated cutter or cutters being returned to the initial position thereof between intersections of the tubing by the cutter or cutters. There is also disclosed a method of producing the lead screw members with the outwardly projecting cutters mounted thereon.

22 Claims, 25 Drawing Figures

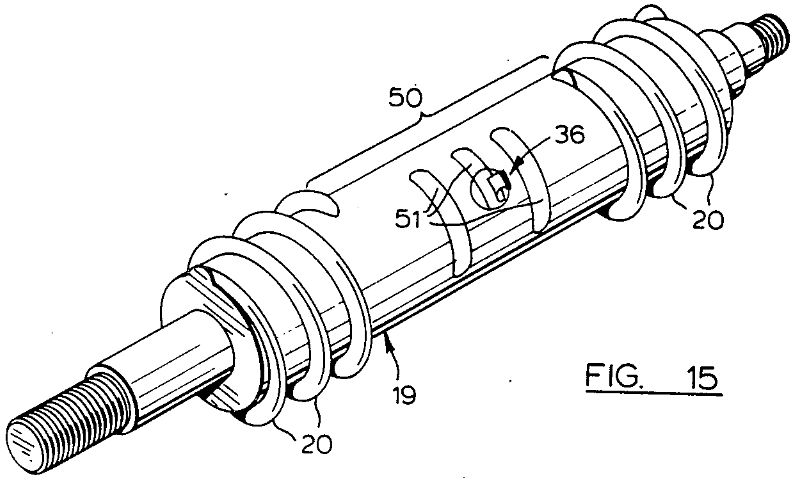
FIG. 15
FIG 14
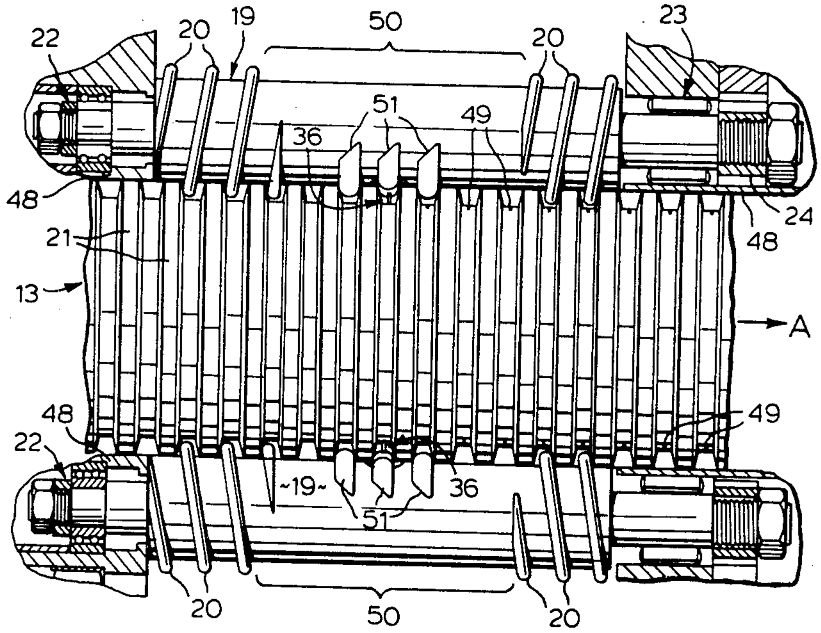

13
19
20
21
25
36
42
44
49
57
58
59
65
66
67
68
69
70
71
72
73
74

APPARATUS AND METHOD FOR PERFORATING TUBING

CROSS REFERENCE TO RELATED APPLICATION

This application is a continuation-in-part of our copending application Ser. No. 881,417, filed Feb. 27, 1978 now U.S. Pat. No. 4,180,357 issued Dec. 25, 1979 for "Apparatus and Method for Perforating Tubing and Method of Producing Part of such Apparatus".

This invention is concerned with apparatus for perforating tubing. Such tubing which may be of a thermoplastic material such as, for example, polyethylene, may be used as underground drainage piping, water operatively percolating into the tubing through the perforations therein for drainage along the tubing.

It has hitherto been proposed to form the perforations in such tubing by passing the unperforated tubing after its formation in, for example, a blow-moulding apparatus to an apparatus in which rotary cutter means is engaged with the walls of the tubing to form the required perforations. Such apparatus is disclosed in U.S. Pat. No. 3,957,386 issued on May 18, 1976 and in Canadian patent application No. 260,094 filed on Aug. 27, 1976. The forms of apparatus disclosed in the above-numbered United States patent and Canadian patent application are, however, relatively complex, and it is accordingly a primary object of one aspect of the present invention to provide apparatus for perforating tubing which substantially obviates or mitigates the above disadvantage of the forms of apparatus disclosed in the above-numbered United States patent and Canadian patent application in that it is relatively simple and as a result very dependable in operation.

According to this one aspect of the present invention there is provided apparatus which comprises drive means for advancing tubing along an axial path thereof, and at least one cutter rotatably mounted in a rotary path which intersects the tubing and which is in a plane substantially at right angles to said axial path of the tubing for intermittent intersection of the tubing by the cutter. The mounting of the cutter permits movement of the cutter by the tubing in a direction parallel to said axial path from a rearward position to a forward position during operative intersection of the tubing by the cutter. The apparatus further comprises a return member for movement of the cutter from the forward position to the rearward position between operative intersections of the tubing by the cutter, and support means for supporting the tubing and restraining the tubing against rotation thereof about said axial path during operative intersection of the tubing by the cutter.

The present invention is also concerned with a method of perforating tubing, and it is a primary object of a further aspect of the invention to provide such a method.

According to this further aspect of the present invention there is provided a method of perforating tubing, the method comprising the steps of advancing the tubing along an axial path thereof, and simultaneously rotating at least one cutter in a rotary path which is in a plane substantially at right angles to said axial path of the tubing and which intersects the tubing thereby to perforate the tubing by intermittent intersection of the tubing by the cutter, while the cutter is being moved by the tubing in a direction parallel to said axial path from a rearward position to a forward position thereof. The method further comprises returning the cutter from the forward position to the rearward position between operative intersections of the tubing by the cutter, the tubing being supported and being restrained against rotation thereof about said axial path during intersection of the tubing by the cutter.

In order that the present invention may be more clearly understood and more readily carried into effect the same will now, by way of example, be more fully described with reference to the accompanying drawings in which:

FIG. 14 is a partially sectioned side view corresponding to a portion of FIG. 2, but showing a different form of apparatus for perforating tubing;

FIG. 15 is an isometric view of part of the apparatus shown in FIG. 14;

Figure 1:
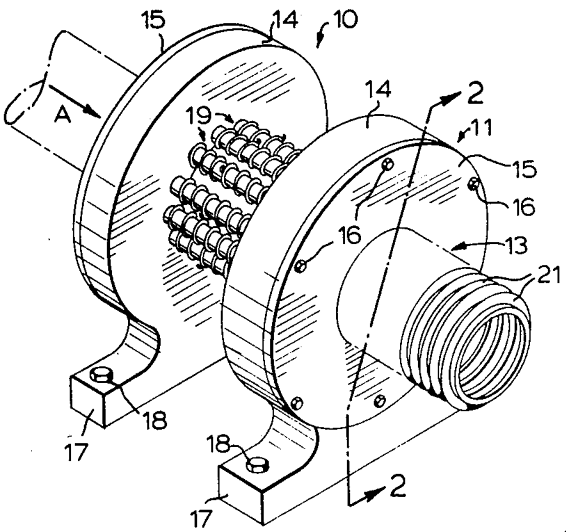
FIG. 1 is a view of apparatus for perforating tubing.

Referring to FIGS. 1 to 13, inclusive, of the drawings, the apparatus comprises a frame structure constituted, in the preferred embodiment of the invention, by two spaced end housings 10 and 11 which have coaxially disposed central openings 12 through which tubing 13, which may be of thermoplastic material, is operatively advanced in the direction of the arrow A (FIG. 1), as is hereinafter described. Each of the end housings 10 and 11 comprises a body member 14, and an end cover 15 which is secured to the associated body member 14 by, for example, bolts 16, each body member 14 presenting a base 17 which is adapted to be secured to a support surface by means of bolts 18.

The apparatus further comprises drive means for advancing the tubing 13 along the axial path A thereof, this drive means comprising, in the preferred embodiment shown in the drawings, a plurality of lead screw members 19 having screw threading 20 for meshing engagement with corrugations 21 presented by the tubing 13. The lead screw members 19 which are disposed substantially parallel to the axial path A of the tubing 13 and which extend between the end housings 10 and 11 are each rotatably mounted in these end housings 10 and 11, the end portions of the lead screw members 19 which are rotatably mounted in the end housing 10 being so mounted by means of ball bearings which are denoted generally by the reference numberals 22 and which may be of conventional form, and the end portions of the lead screw members 19 which are rotatably mounted in the end housing 11 being so mounted by means of roller bearings which are denoted generally by the reference numberals 23 and which may likewise be of conventional form.

A gear wheel 24 is screw-threadedly mounted on the end portion of each lead screw member 19 within the end housing 11 and is locked by a nut 25. A drive shaft 26 which is disposed substantially parallel to the axial path A is journalled in the body members 14 of the end housings 10 and 11 by means of roller bearings which are denoted generally by the reference numberals 27 and which may again be of conventional form, the end portion of the shaft 26 within the end housing 11 having a gear wheel 28 keyed thereto, and the opposed end portion of the shaft 26 extending through an opening in the end cover 15 of the housing 10 and projecting therefrom for connection to an appropriate drive means (not shown) for operatively rotating the drive shaft 26.

Figure 3:
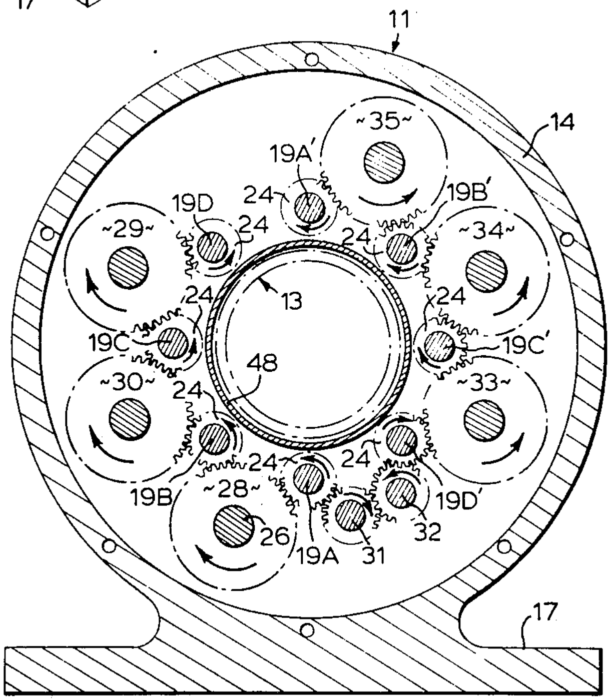
FIG. 3 is a sectioned end view on the line 3—3 in FIG. 2.
Figure 2:
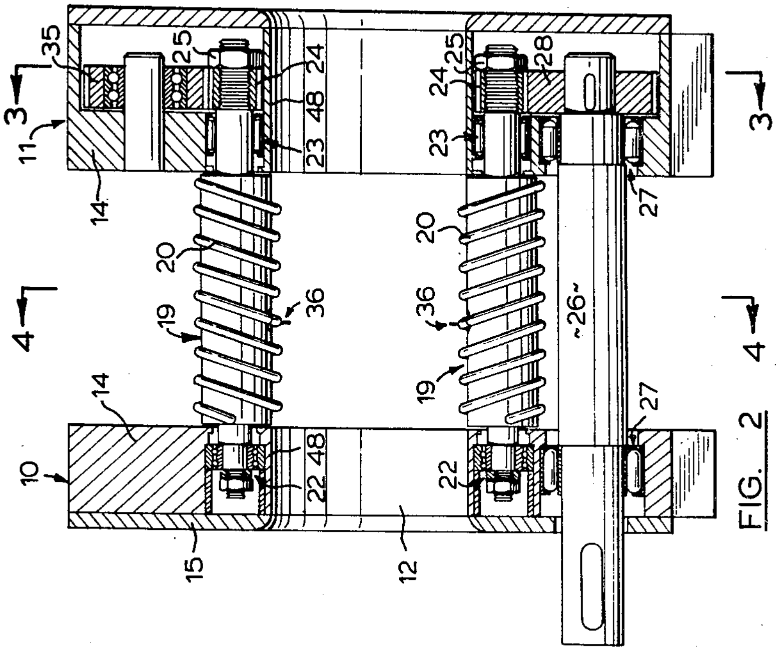
FIG. 2 is a sectioned side view, on an enlarged scale, generally on the line 2—2 in FIG. 1.

As is most clearly shown in FIG. 3, the gear wheel 28 operatively drives the gear wheels 24 of all the lead screw members 19 through idler gears 29, 30, 31, 32, 33, 34 and 35. More particularly, the lead screw members 19 are disposed in pairs, with the lead screw members 19 of each pair thereof preferably being diametrically opposed relative to the axial path A. Thus, with reference to the preferred embodiment of the invention, the pairs of lead screw members 19 are constituted by the members 19A and 19A′, 19B and 19B′, 19C and 19C′, and 19D and 19D′, the gear wheels 24 of the members 19A and 19B being operatively driven in the same direction directly by the gear wheel 28, the gear wheel 24 of the member 19C being operatively driven in said same direction by the idler gear wheel 30 which is driven by the gear wheel 24 of the member 19B, and the gear wheel 24 of the member 19D being operatively driven again in said same direction by the idler gear wheel 29 which is driven by the gear wheel 24 of the member 19C. The gear wheel 24 of the member 19D′ is operatively driven but in the opposite direction through the two idler gear wheels 31, 32 from the gear wheel 24 of the member 19A, the gear wheel 24 of the member 19C′ is operatively driven in said opposite direction by the idler gear wheel 33 which is driven by the gear wheel 24 of the member 19D′, the gear wheel 24 of the member 19B′ is operatively driven again in said opposite direction by the idler gear wheel 34 which is driven by the gear wheel 24 of the member 19C′, and the gear wheel 24 of the member 19A′ is operatively driven once again in said opposite direction by the idler gear wheel 35 which is driven by the gear wheel 24 of the member 19B′. The screw threading 20 of the lead screw members 19 of each pair thereof is of opposite hand.

With reference to FIGS. 1 to 13, inclusive, there is mounted on each of the lead screw members 19 a cutter 36 which is operatively moved with the associated lead screw member 19 only in a fixed rotary path of circular form which is thus in a plane substantially at right angles to the axial path A and which intersects the tubing 13 thereby to perforate the tubing 13 as is hereinafter more fully described, each cutter 36 being outwardly directed relative to said rotary path thereof. There may of course be more than one cutter 36 mounted on each of the lead screw members 19.

Figure 5:
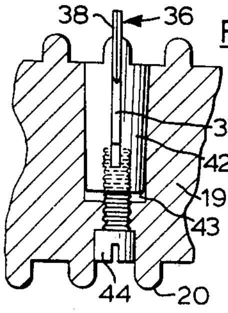
FIG. 5 is a sectioned view, on a further enlarged scale, on the line 5—5 in FIG. 4.
Figure 6:
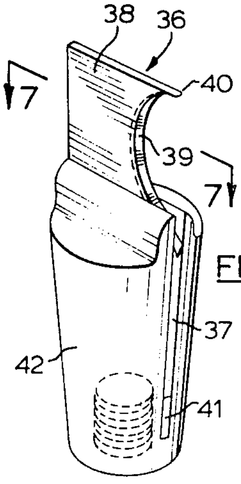
FIG. 6 is a view, on a still further enlarged scale, of part of the apparatus shown in the preceding views.
Figure 7:
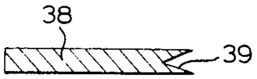
FIG. 7 is a sectioned view on the line 7—7 in FIG. 6.

As is most clearly shown in FIGS. 5, 6 and 7, each cutter 36 comprises an inner shank portion 37 together with an outer cutting portion 38 having a concave leading edge 39 which constitutes a cutting edge and is preferably of V-shape in cross-section as shown in FIG. 7 and which terminates at the end of the cutting portion 38 remote from the shank portion 37 in a cutting point 40. The shank portion 37 of the cutter 36 is disposed within a slot 41 which is formed in a plug 42, the plug 42 being removably mounted in a recess 43 within the associated lead screw member 19 by means of a screw member 44 which is screw-threadedly engaged with the plug 42. The shank portion 37 of the cutter 36 is securely clamped in the slot 41 under the influence of the interengagement between the plug 42 and the walls of the recess 43. Thus, for example, in the preferred embodiment of the invention shown in the drawings, the plug 42 is of tapered form so that as the plug 42 is urged into the recess 43 on tightening of the screw member 44 the width of the slot 41 is reduced with resultant clamping of the shank portion 37 of the cutter 36 in the slot 41.

Figure 8:
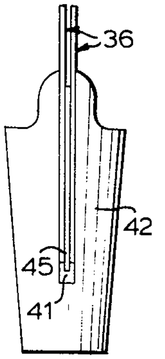
FIG. 8 is a side view of the part of the apparatus shown in FIG. 6, but according to an alternative embodiment of the invention.

FIG. 8 shows an alternative embodiment which differs from that described above with reference to FIGS. 5, 6 and 7 in that there are two cutters 36 disposed within the slot 41 in the plug 42, the two cutters 36 being separated by a spacer member 45.

Figure 9:
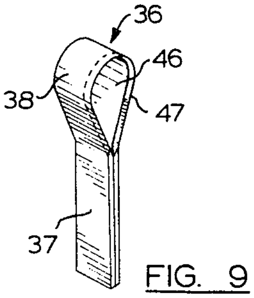
FIG. 9 is a view of a part of the apparatus according to a still further embodiment of the invention.

FIG. 9 shows an alternative form of cutter 36 which is formed of a strip of metal which is reflexly bent with the contacting side-by-side end portions of the strip constituting the shank portion 37 of the cutter 36, the cutting portion 38 being in the form of a loop 46 having a leading edge 47 which is sharpened to provide a cutting edge.

In operation, the drive shaft 26 is rotatably driven with, as hereinbefore described, resultant rotation of the lead screw members 19 in the directions shown in FIG. 3. The screw threading 20 of the members 19 is in meshing engagement with the corrugations 21 of the tubing 13 so that said rotation of the lead screw members 19 causes advancement of the tubing 13 along the axial path A.

Figure 4:
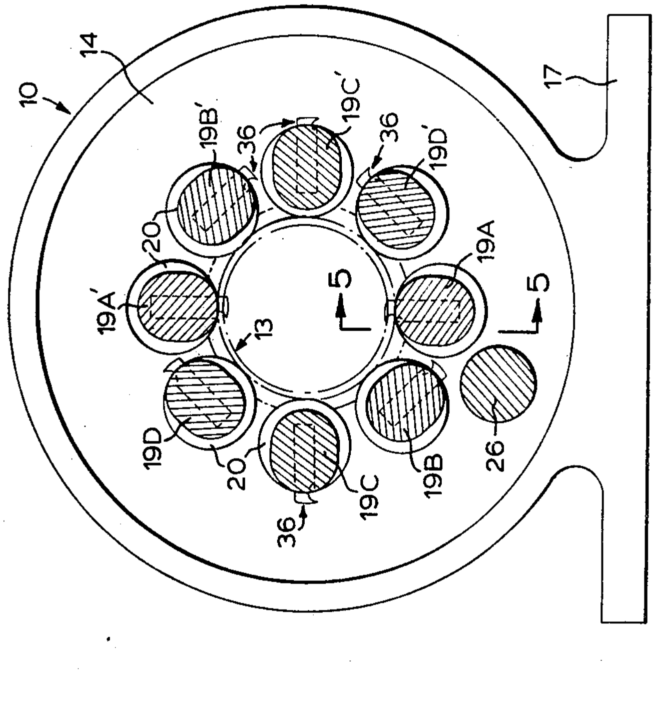
FIG. 4 is a sectioned view on the line 4—4 in FIG. 2.

Said rotation of the lead screw members 19 also, of course, causes rotation of each cutter 36 in its rotary path, and as each cutter 36 intermittently intersects the tubing 13 the tubing is thereby perforated. FIG. 4 shows the operative condition in which the cutters 36 mounted on the pair of lead screw members 19A and 19A' are perforating the tubing 13. The cutters 36 mounted on each said pair of the lead screw members 19 are synchronized for substantially simultaneous intersection with the tubing 13 and since these cutters 36 rotate in opposite directions they operatively exert on the tubing 13 during perforation of the tubing 13 substantially equal but opposite forces. Thus, these cutters 36 mounted on each said pair of the members 19 constitute means for restraining the tubing 13 against rotation during operative intersection of the tubing 13 by these cutters 36. Furthermore, the lead screw members 19, together with annular portions 48 of the body members 14 of the end housings 10 and 11, constitute support means for supporting the tubing 13.

Figure 13:
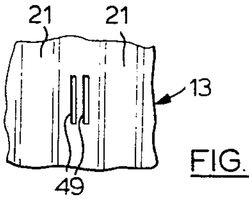
FIG. 13 is a side view of a portion of perforated tubing produced by apparatus part of which is shown in FIG. 8.
Figure 10:
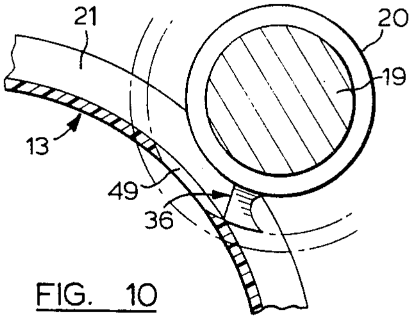
FIG. 10 is a view showing a feature of the apparatus.
Figure 12:
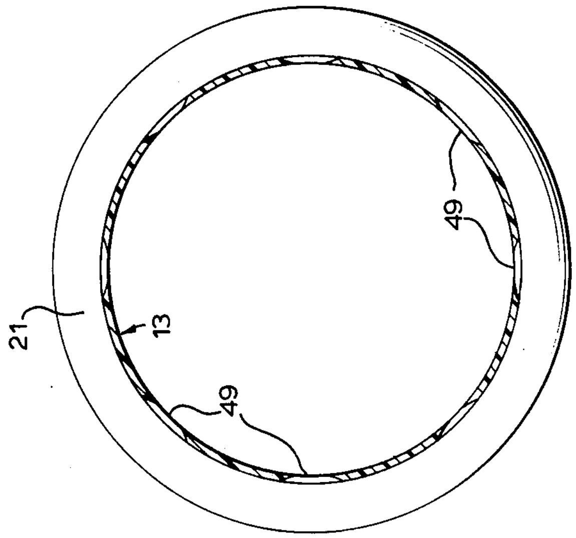
FIG. 12 is a sectioned view on the line 12—12 in FIG. 11.
Figure 11:
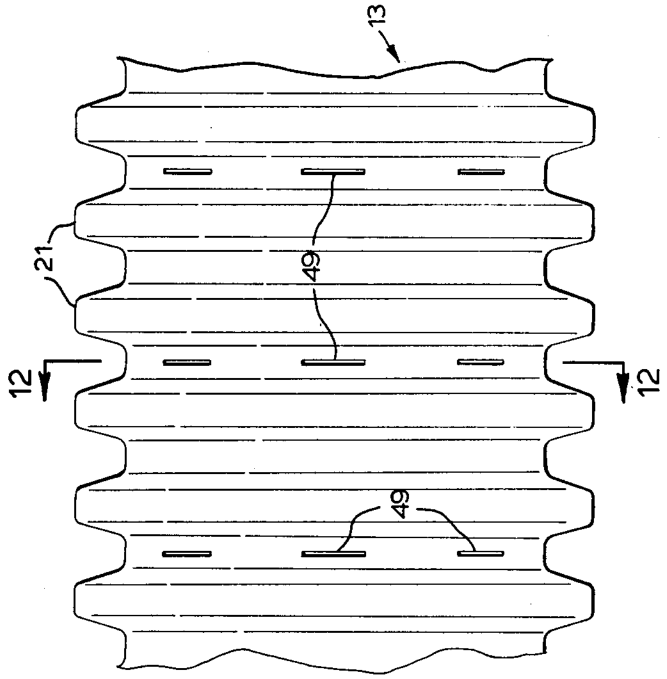
FIG. 11 is a side view of a portion of perforated tubing produced by the apparatus.

FIGS. 11 and 12 show the perforations 49 in the perforated tubing 13 produced by the apparatus as hereinbefore described, FIG. 13 showing the form of the perforations 49 produced by the alternative embodiment described above with reference to FIG. 8. In order, as shown in FIG. 10, to alter the lengths of the perforations 49 produced in the tubing 13 the distance to which each cutter 36 outwardly projects from the associated lead screw member 19 is preferably adjustable, this being readily achieved by altering the position of the shank portion 37 of each cutter 36 within the slot 41 of the associated plug 42.

It will be appreciated that the minimum circumferential spacing between adjacent perforations 49 in the tubing 13 is dependent on the minimum spacing which is possible between adjacent ones of the lead screw members 19, and if desired there may be provided, in combination, a plurality of apparatuses as hereinbefore described in which the apparatuses are disposed with the axial paths A thereof in alignment, the cutters 36 of each of the apparatuses being in non-alignment, as viewed in the direction of said axial paths A, with the cutters 36 of each of the other of the apparatuses. In this manner, there may be provided perforations 49 in the tubing 13 between perforations 49 which are circumferentially spaced apart the minimum possible distance when using one apparatus.

Each lead screw member 19 as hereinbefore described may be formed by drilling or otherwise forming the recess 43 in the cylindrical wall of a cylindrical member, and then mounting the plug 42 within this recess 43 by means of the screw member 44 the head of which is deeply recessed into the cylindrical wall of the cylindrical member. The screw threading 20 is then machined or otherwise formed on the cylindrical wall of the cylindrical member while the plug 42 remains mounted in the recess 43. Thereafter, the slot 41 is formed in the plug 42 by, most conveniently, first removing the plug 42 from the recess 43, and the associated cutter 36 is then mounted within the slot 41 and the plug 42 is remounted within the recess 43 by means of the screw member 44, as hereinbefore described.

It is generally preferred that the perforations 49 in the tubing 13 be provided in the valleys between the corrugations 21, so that each cutter 36, and the associated plug 42, are preferably disposed at the crest of the fluting of the screw threading 20. It will, however, be appreciated that if it is desired to form some or all of the perforations 49 in the corrugations 21 of the tubing 13 rather than solely in the valleys between these corrugations 21 the appropriate cutter or cutters 36, and the associated plug or plugs 42, can of course be disposed between the fluting of the screw threading 20.

Except as hereinafter described the forms of the apparatus illustrated in FIGS. 14 to 20, inclusive, correspond to the apparatus as hereinbefore described with reference to FIGS. 1 to 7, inclusive, 10, 11 and 12 of the drawings, and in FIGS. 14 to 20, inclusive, like reference numerals are used as in FIGS. 1 to 7, inclusive, 10, 11 and 12 to denote like parts.

In the apparatus as hereinbefore described with reference to FIGS. 1 to 7, inclusive, 10, 11 and 12 the screw threading 20 on each lead screw member 19 extends continuously along the lead screw member 19 so that the tubing 13 operatively continues its advance along the axial path A thereof during the intersection of the tubing 13 by the cutter or cutters 36. This results, of course, in each perforation 49 which is thus formed in the tubing 13 being disposed in a direction having a component parallel to the axial path A of the tubing 13, rather than the perforation 49 being disposed in a direction which is truly circumferential around the tubing 13. In many cases this feature will be quite acceptable, but in some cases this feature may be undesirable and there is accordingly also provided apparatus for perforating tubing in which the perforations operatively formed in the tubing by the apparatus are each circumferentially disposed, together with a method of perforating tubing in which the perforations formed in the tubing are each circumferentially disposed. Thus, referring to FIGS. 14 and 15 it will be noted that a central portion 50 of each lead screw member 19 is devoid of the screw threading 20, this portion 50 presenting a plurality of, say, three axially spaced ribs 51 which are each circumferentially disposed and are axially spaced from the adjacent screw threading 20. Furthermore each rib 51 extends only partially around the circumference of the lead screw member 19.

During operative rotatable driving of the drive means comprising the lead screw members 19 with resultant advance of the tubing 13 along the axial path A thereof, as hereinbefore described, the ribs 51 of each lead screw member 19 enter into meshing engagement with the corrugations 21 of the tubing 13, as is clearly shown in FIG. 14, at least the leading ends of the ribs 51 preferably being of tapered width to facilitate this entry of the ribs 51 into meshing engagement with the corrugations 21 of the tubing 13. While the ribs 51 are so meshingly engaged with the corrugations 21 of the tubing 13 the associated part of the tubing 13 is restrained against advance along the axial path A thereof, and during this meshing engagement of the ribs 51 with the corrugations 21 of the tubing 13 the cutter 36 intersects said associated part or intersected part of the tubing 13 to perforate the tubing 13, the cutter 36 preferably being mounted on one of the ribs 51 such as the central rib 51 for operative rotation therewith. Thus, since advance of at least the intersected part of the tubing 13 along the axial path A thereof during the intersection of the tubing 13 by the cutter 36 is stopped by, with reference to FIGS. 14 and 15, means constituted by the ribs 51 restraining the intersected part of the tubing 13 against said advance, it will be appreciated that the perforation 49 which is thereby formed in the tubing 13 is disposed in a truly circumferential direction.

The axial spacing between the ribs 51 of each lead screw member 19 and the adjacent screw threading 20 thereof accommodates resilient deformation of the tubing 13 in the direction of the axial path A thereof during the meshing engagement of the ribs 51 with the corrugations 21 of the tubing 13, the tubing 13 being so resiliently deformable by, for example, being formed of a thermoplastic material such as polyethylene, as hereinbefore described. Thus, it will be appreciated that, during the meshing engagement of the ribs 51 of each lead screw member 19 with the corrugations 21 of the tubing 13, the screw threading 20 of the lead screw member 19 on either side of the ribs 51 continues to advance the tubing 13 along the axial path A thereof with resultant resilient extension of the tubing 13 in the portion of the tubing 13 between the ribs 51 and the screw threading 20 which is in advance of the ribs 51 relative to the direction of the axial path A, and with resultant resilient compression of the tubing 13 in the portion of the tubing 13 between the ribs 51 and the screw threading 20 which is behind the ribs 51 relative to the direction of the axial path A. As herein described with reference to FIGS. 14 and 15, the portion 50 of each lead screw member 19 is centrally disposed with screw threading 20 in advance of and behind the portion 50, but it will of course be appreciated that if this portion 50 of the lead screw member 19 is disposed at the forward end of the lead screw member 19 with screw threading 20 only behind this portion 50 the tubing 13 need of course only be resiliently compressible, while conversely if the portion 50 is disposed at the rearward end of the lead screw member 19 with screw threading 20 only in advance of this portion 50 the tubing 13 need of course only be resiliently extendible.

The ribs 51 extend around the associated lead screw member 19 to an extent sufficient to ensure that these ribs 51 are in meshing engagement with the corrugations 21 of the tubing 13 throughout the entirety of the intersection of the tubing 13 by the cutter 36, and thus the extent of the ribs 51 around the circumference of the lead screw member 19 is dependent on the length of the perforations 49 formed in the tubing 13 by the cutter 36. Typically, the ribs 51 may extend around approximately one quarter of the circumference of the lead screw member 19, although it will be noted that as shown in FIG. 15 the central rib 51 on which the cutter 36 is mounted may be of reduced length.

As the ribs 51 disengage from the corrugations 21 of the tubing 13 the above-described resilient deformation of the tubing 13 is of course relieved.

Although as hereinbefore described the portion 50 of the lead screw member 19 is provided with a plurality of the ribs 51 this portion 50 may in alternative embodiments (not shown) be provided with only one such rib 51.

Figure 17:
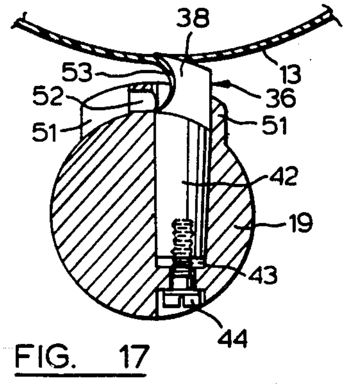
FIG. 17 is a sectioned view on the line 17—17 in FIG. 16.
Figure 16:
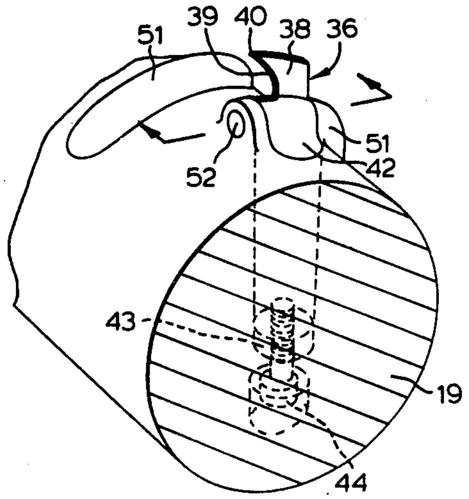
FIG. 16 is a view of part of the apparatus shown in FIGS. 14 and 15.

Referring now to FIGS. 16 and 17, the rib 51 on which the cutter 36 is mounted may be provided with an open-ended bore 52 which is circumferentially formed through the portion of said rib 51 between the leading end of said rib 51 and the recess 43, one end of the bore 52 thereby communicating with the concave leading edge 39 at the end thereof remote from the cutting point 40, so that as the cutter 36 operatively intersects the tubing 13 as shown in FIG. 17 the leading end of the chip 53 which is removed from the tubing 13 to form a perforation 49 therein is directed into the bore 52 for discharge of the chip 53 therethrough. This substantially prevents the trailing end of the chip 53 from remaining attached to the tubing 13 after the intersection of the tubing 13 by the cutter 36 has been completed.

Figure 19:
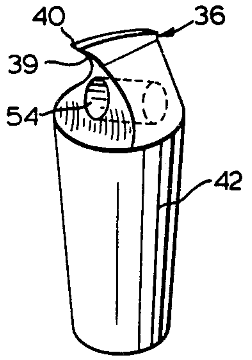
FIG. 19 is a view of part of the apparatus shown in the preceding views, but according to a yet still further embodiment of the invention.

FIG. 19 shows a further embodiment in which the cutter 36 is integrally formed with the plug 42, an open-ended bore 54 the function of which corresponds to that of the bore 52 being provided therethrough for the discharge of the chips 53.

Figure 18:
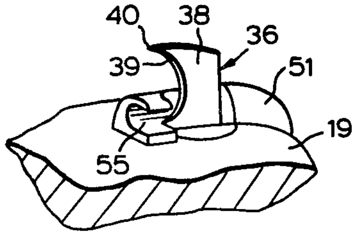
FIG. 18 is a view corresponding to FIG. 16 of a portion of the apparatus shown therein according to a modified form thereof.
Figure 20:
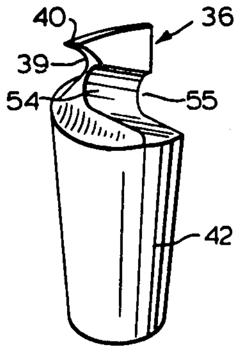
FIG. 20 is a view corresponding to FIG. 19, but showing the part of the apparatus illustrated therein according to a modified form thereof.

FIGS. 18 and 20 show correspondingly modified forms of the structures illustrated in FIGS. 16 and 17 and in FIG. 19, respectively, in which a side 55 of each bore 52 and 54 is open in a direction transverse to the plane containing the rotary path of the cutter 36 for facilitating clearing of the chips 53, thereby to avoid any risk of these chips 53 clogging the bore 52 or 54, respectively.

Except as hereinafter described each apparatus according to the preferred embodiments of the present invention illustrated in FIGS. 21 to 25, inclusive, corresponds to the apparatus as hereinbefore described with particular reference to FIGS. 14 and 15, and in FIGS. 21 to 25, inclusive, like reference numerals are used as in FIGS. 14 and 15 to denote like parts.

As hereinbefore described with reference to FIGS. 14 and 15 there is provided apparatus for perforating tubing in which the perforations operatively formed in the tubing by the apparatus are each circumferentially disposed, together with a method of perforating tubing in which the perforations formed in the tubing are each circumferentially disposed. However, it is a requirement of this apparatus and method as hereinbefore described with reference to FIGS. 14 and 15 that the tubing 13 be of a material which is resiliently deformable, but in some cases it may be desired that the tubing 13 be of a material which is not resiliently deformable, or at least which is not sufficiently resiliently deformable for satisfactory functioning of the apparatus and method as hereinbefore described with reference to FIGS. 14 and 15, and there is accordingly also provided apparatus for perforating tubing in which the perforations operatively formed in the tubing by the apparatus are each circumferentially disposed, together with a method of perforating tubing in which the perforations formed in the tubing are each circumferentially disposed, even where the tubing is of a material which is not resiliently deformable.

Figure 21:
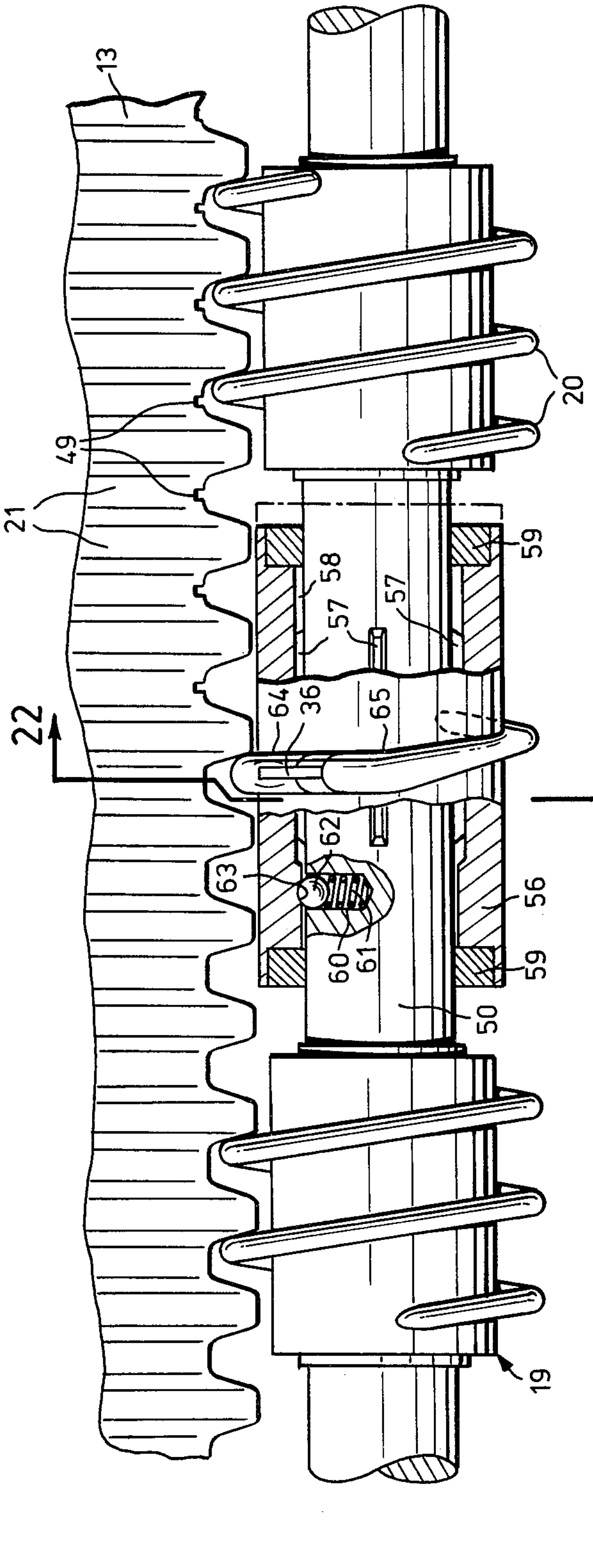
FIG. 21 is a partially sectioned side view corresponding to a portion of FIG. 2, but showing apparatus according to a preferred embodiment of the present invention.
Figure 22:
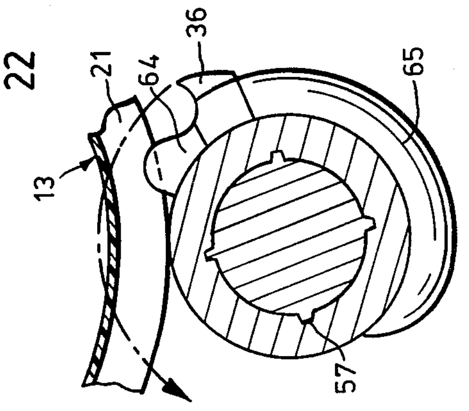
FIG. 22 is a sectioned view on the line 22—22 in FIG. 21.

Thus, referring to FIGS. 21 and 22 it will be noted that the central portion 50 of each lead screw member 19 and which is devoid of the screw threading 20 is of reduced diameter, a slide member 56 constituted preferably by a sleeve being slidably and non-rotatably mounted on the portion 50 of the lead screw member 19. Preferably this slidable and non-rotatable mounting of the sleeve 56 on the portion 50 of the lead screw member 19 comprises a splined connection between the sleeve 56 and the portion 50, this splined connection being constituted by one or more longitudinally extending, outwardly directed splines 57 which are presented by the portion 50 and which are each slidably disposed within a complementary groove 58 provided in the inner face of the sleeve 56. As will be noted from FIGS. 21 and 22 there are in the preferred embodiment illustrated therein four equiangularly disposed splines 57 and complementary grooves 58.

The cutter 36 is mounted on a circumferentially disposed rib 64 which is presented by the sleeve 56 and which extends only partially around the sleeve 56, the sleeve 56 being slidable on the portion 50 of the lead screw member 19 in a direction parallel to the axial path A of the tubing 13 between a rearward position of the cutter 36 and the sleeve 56 (the position in which the sleeve 56 is shown in full lines in FIG. 21) and a forward position of the cutter 36 and the sleeve 56 (the position in which the right-hand end of the sleeve 56 is shown in chain-dotted lines in FIG. 21), and bearing rings 59 being mounted in the ends of the sleeve 56 for sliding contact with the portion 50 of the lead screw member 19. Preferably, the portion 50 is provided with a recess 60 within which is disposed a coil spring 61 and a ball 62 which is urged by the spring 61 out of the recess 60 into a detent 63 provided in the inner face of the sleeve 56 when the sleeve is in the rearward position, resiliently to restrain the sleeve 56 in this rearward position.

During operative rotation of each lead screw member 19 with resultant advancing of the tubing 13 along the axial path A thereof the rib 64 enters into meshing engagement with the corrugations 21 of the tubing 13 as the sleeve 56 rotates with the screw member 19, the leading end of the rib 64 preferably being of tapered form to facilitate this entry of the rib 64 into meshing engagement with the corrugations 21 of the tubing 13. While the rib 64 is so meshingly engaged with the corrugations 21 of the tubing 13 the cutter 36, together of course with the sleeve 56, is thereby moved with the tubing 13 from the above-mentioned rearward position to the forward position so that during the intersection of the tubing 13 by the cutter 36 there is substantially no relative movement between the tubing 13 and the cutter 36 in the direction of the axial path A with the result that the perforations formed in the tubing 13 by the cutter 36 are circumferentially disposed.

The apparatus also comprises a return member for movement of the cutter 36, and of the sleeve 56, from the above-mentioned forward position to the rearward position, this return member in the preferred embodiment of the invention shown in FIGS. 21 and 22 comprising a helically disposed rib 65 which is presented by the sleeve 56 and which extends only partially around the slide member 56, the pitch of this helically disposed rib 65 which as will be noted may constitute a continuation of the rib 64 being such that, after completion of the intersection of the tubing 13 by the cutter 36 and disengagement of the rib 64 from the corrugations 21 of the tubing 13, the rib 65 under the influence of the corrugations 21 of the tubing 13 meshingly engaged therewith operatively urges the sleeve 56 and hence also the cutter 36 back to the rearward position in which the ball 62 is resiliently re-engaged with the detent 63.

Figures 23, 24, 25:
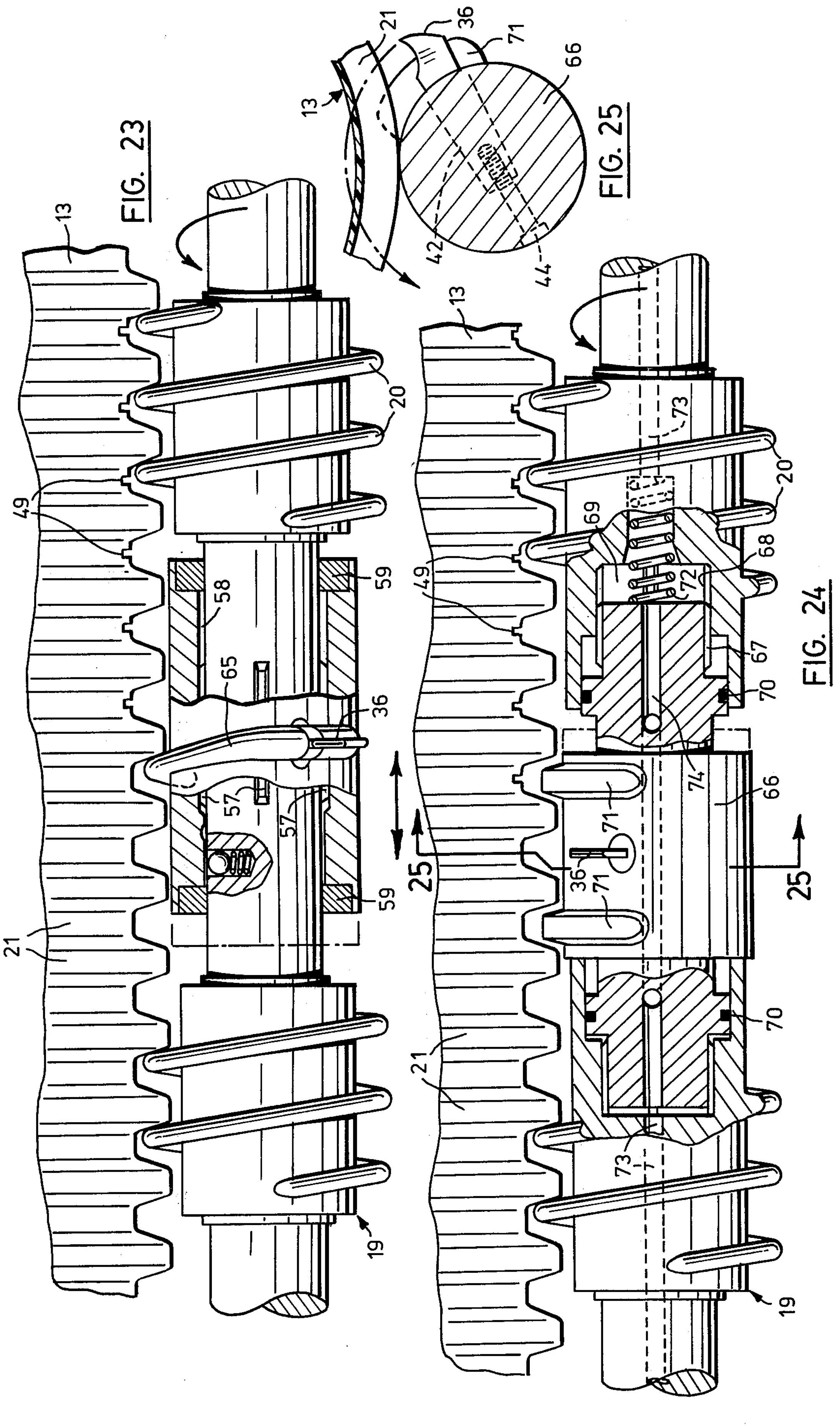
FIG. 23 is a partially sectioned side view corresponding to FIG. 21, but showing an alternative form of the preferred embodiment shown therein.
FIG. 24 is a partially sectioned side view corresponding to FIGS. 21 and 23, but showing an alternative preferred embodiment of the present invention.
FIG. 25 is a sectioned view on the line 25—25 in FIG. 24.

The form of the invention shown in FIG. 23 differs from the preferred embodiment hereinbefore described with reference to FIGS. 21 and 22 only in that, whereas in the preferred embodiment shown in FIGS. 21 and 22 the helically disposed rib 65 constitutes a continuation of the rib 64 extending from the trailing end thereof so that the cutter 36 and the sleeve 56 are operatively returned to the rearward position immediately after completion of the intersection of the tubing 13 by the cutter 36, in the alternative form shown in FIG. 23 the helically disposed rib 65 constitutes a continuation of the rib 64 from the leading end thereof so that in this alternative embodiment the cutter 36 and the sleeve 56 are returned to the rearward position immediately preceding the intersection of the tubing 13 by the cutter 36. Furthermore, in FIG. 23 the leading end of the rib 65 instead of the leading end of the rib 64 is preferably of tapered form, to facilitate entry of the rib 65 into meshing engagement with the corrugations 21 of the tubing 13. In FIG. 23 the sleeve 56 is shown in full lines in the forward position of the cutter 36, with the left-hand end of the sleeve 56 being shown in chain-dotted lines when the cutter 36 is in the rearward position thereof.

The alternative preferred embodiment of the present invention shown in FIGS. 24 and 25 differs from that hereinbefore described with reference to FIGS. 21 and 23, inclusive, in that in FIGS. 24 and 25 each lead screw member 19 is constituted by two spaced portions, with the slide member constituted by an insert member 66 the end portions of which present splines 67 slidably and non-rotatably disposed within complementary grooves 68 provided in the walls of recesses 69 in the adjacent ends of the two spaced portions of the lead screw member 19. 70 denotes each of two annular seals which are mounted on the end portions of the insert member 66 for sealing contact with the walls of portions of the recesses 69 of increased diameter.

Furthermore, in FIGS. 24 and 25 the rib 64 of the embodiment of FIGS. 21 to 23, inclusive, is replaced by two axially spaced circumferentially disposed ribs 71 which extend only partially around the insert member 66 and between which the cutter 36 is mounted on the insert member 66. Also, instead of the helically disposed rib 65 of the embodiment shown in FIGS. 21 to 23, inclusive, there is provided in the embodiment shown in FIGS. 24 and 25 a coil spring 72 which acts between the insert member 66 and one of the portions of the lead screw member 19 resiliently to urge the insert member 66 in the direction from the forward position of the cutter 36 and the insert member 66 (in which the right-hand end of the insert member 66 is shown in chain-dotted lines) to the rearward position thereof (in which the insert member 66 is shown in full lines). In this rearward position the insert member 66 abuts against the end face of the appropriate portion of the lead screw member 19, so that in this embodiment shown in FIGS. 24 and 25 the recess 60, spring 61, ball 62 and detent 63 shown in FIGS. 21 and 23 are omitted. Each of the two spaced portions of the lead screw member 19 may be provided with a bore 73, a bore 74 also being provided through the insert member 66 between the ends thereof, so that lubricating oil may operatively be supplied through these bores 73 and 74 and through the recesses 69 in order to lubricate the splined connection constituted by the splines 67 and the complementary grooves 68.

As will be appreciated the operation of the alternative embodiment of the invention shown in FIGS. 24 and 25 is substantially the same as that hereinbefore described with reference to the preferred embodiment shown in FIGS. 21 to 23, inclusive.

As will be appreciated the rib 64 (FIGS. 21, 22 and 23) and the ribs 71 (FIGS. 24 and 25) extend around the sleeve 56 (FIGS. 21, 22 and 23) and around the insert member 66 (FIGS. 24 and 25) to an extent sufficient to ensure that this rib 64 and ribs 71 are in meshing engagement with the corrugations 21 of the tubing 13 throughout the entirety of the intersection of the tubing 13 by the cutter 36, and thus the extent of the rib 64 around the sleeve 56 (FIGS. 21, 22 and 23) and of the ribs 71 around the insert member 66 (FIGS. 24 and 25) is dependent on the length of the perforations 49 formed in the tubing 13 by the cutter 36.

While as hereinbefore described the rib 64 (FIGS. 21, 22 and 23) or the ribs 71 (FIGS. 24 and 25) operatively meshingly engage with the corrugations 21 of the tubing 13 to move the sleeve 56 and the cutter 36 (FIGS. 21, 22 and 23) or the insert member 66 and the cutter 36 (FIGS. 24 and 25) from the rearward position to the forward position, it will be understood that these ribs 64 or 71 could be omitted with the sleeve 56 and the cutter 36 (FIGS. 21, 22 and 23) or the insert member 66 and the cutter 36 (FIGS. 24 and 25) being moved by the tubing 13 from the rearward position to the forward position by the engagement of the cutter 36 with the tubing 13 during intersection of the tubing 13 by the cutter 36. More than one cutter 36 may of course be mounted on the sleeve 56 (FIGS. 21, 22 and 23) or on the insert member 66 (FIGS. 24 and 25). Furthermore, instead of the helically disposed rib 65 (FIGS. 21, 22 and 23) or the coil spring 72 (FIGS. 24 and 25) alternative means (not shown) could be provided for returning the cutter 36, and the sleeve 56 or the insert member 66, from the forward position to the rearward position. Thus, for example, a plunger acting on the sleeve 56 or the insert member 66 could be provided, this plunger rod being actuated by for example a rotary cam face the rotation of which is appropriately timed relative to the rotation of the lead screw member 19 to move the sleeve 56 so the insert member 66 from the forward position to the rearward position between intersections of the tubing 13 by the cutter 36. Alternatively, an end edge of the sleeve 36 or of the insert member 66 could be provided with an appropriately shaped cam face bearing against a fixed member, so that as the sleeve 56 or the insert member 66 operatively rotate the bearing contact between the fixed member and the cam face causes the sleeve 56 or the insert member 66 to move from the forward position to the rearward position between intersections of the tubing 13 by the cutter 36.

While in the apparatus as hereinbefore described with reference to the accompanying drawings, the drive means for advancing the tubing 13 along the axial path A comprises the plurality of lead screw members 19 it will be appreciated that in alternative embodiments (not shown) there may be provided only one lead screw member 19 for advancing the tubing 13 along the axial path A, or other means may be provided for advancing the tubing 13 which need not be of corrugated form, along the axial path A. Where the tubing 13 is of corrugated form said other means may comprise for example a rotatably drivable gear wheel the axis of rotation of which is at right angles to the axial path A and the teeth of which engage with the corrugations 21 of the tubing 13.

Furthermore, the apparatus may incorporate any number of cutters 36 each mounted for rotation in a circular rotary path which intersects the tubing 13 and which is in a plane substantially at right angles to the axial path A, including only a single such cutter 36. If, of course, the number and disposition of the cutters 36 is such that cutters 36 of a pair thereof do not substantially simultaneously intersect the tubing 13 while rotating in opposite directions alternative means is provided for restraining the tubing 13 against rotation thereof about the axial path A during operative intersection of the tubing 13 by the cutter or cutters 36. In addition, if the drive means for advancing the tubing 13 along the axial path A is constituted by other than the lead screw members 19 alternative support means may be required for supporting the tubing 13 between the end housings 10 and 11.

I claim:

1. Apparatus for perforating tubing, the apparatus comprising drive means for advancing tubing along an axial path thereof, at least one cutter rotatably mounted in a rotary path which intersects the tubing and which is in a plane substantially at right angles to said axial path of the tubing, for intermittent intersection of the tubing by the cutter, means mounting said cutter by means intermittently engageable with the tubing for moving the cutter by the tubing in a direction parallel to said axial path from a rearward position to a forward position during operative intersection of the tubing by the cutter, a return member for returning the cutter from the forward position to the rearward position between operative intersections of the tubing by the cutter, and support means for supporting the tubing and restraining the tubing against rotation thereof about said axial path during operative intersection of the tubing by the cutter.

2. Apparatus according to claim 1, wherein said at least one cutter comprises a plurality of cutters which constitute one or more pairs thereof, the cutters of each pair thereof being rotatable in opposite directions, with the cutters of each pair thereof being synchronized for substantially simultaneous intersection with the tubing, whereby the support means for restraining the tubing against rotation thereof about said axial path comprises the cutters of each said pair thereof.

3. Apparatus according to claim 2, wherein the cutters of each pair thereof are diametrically opposed relative to said axial path.

4. Apparatus for perforating corrugated tubing, the apparatus comprising drive means for advancing tubing along an axial path thereof, at least one cutter rotatably mounted in a rotary path which intersects the tubing and which is in a plane substantially at right angles to said axial path of the tubing, for intermittent intersection of the tubing by the cutter, means mounting said cutter by means intermittently engageable with the tubing for moving the cutter in a direction parallel to said axial path from a rearward position to a forward position during operative intersection of the tubing by the cutter, a return member for returning the cutter from the forward position to the rearward position between operative intersections of the tubing by the cutter, and support means for supporting the tubing and restraining the tubing against rotation thereof about said axial path during operative intersection of the tubing by the cutter.

5. Apparatus according to claim 4, said mounting means including a slide member for rotation therewith, each slide member being slidably mounted on a lead screw member for slidable movement of the slide member along the lead screw member between said rearward and forward positions of the cutter, and being non-rotatable relative to the lead screw member which is disposed substantially parallel to said axial path of the tubing and which constitutes said drive means, each lead screw member having screw threading for meshing engagement with the corrugations presented by the tubing, with the screw threading of each pair of the lead screw members on which a pair of the cutters is mounted being of opposite hand, and with the lead screw members of each said pair thereof being rotatably drivable in opposite directions for advancing the tubing along said axial path.

6. Apparatus according to claim 4, wherein said drive means comprises at least one lead screw member disposed substantially parallel to said axial path of the tubing, the lead screw member having screw threading for meshing engagement with the corrugations presented by the tubing, and the lead screw member being rotatably drivable for advancing the tubing along said axial path.

7. Apparatus according to claim 4, wherein said drive means comprises at least one lead screw member disposed substantially parallel to said axial path of the tubing, the lead screw member having screw threading for meshing engagement with the corrugations presented by the tubing, the lead screw member being rotatably drivable for advancing the tubing along said axial path, said mounting means including a slide member on which the cutter is mounted for rotation therewith being slidably and non-rotatably mounted on the lead screw member for slidable movement of the slide member along the lead screw member between said rearward and forward positions of the cutter.

8. Apparatus according to claim 6, wherein a plurality of the cutters is mounted on the, or each, slide member.

9. Apparatus according to claim 7, wherein the slide member presents at least one circumferentially disposed rib which extends only partially around the slide member, the rib being disposed for meshing engagement with the corrugations of the tubing during intersection of the tubing by the cutter, whereby the slide member and the cutter mounted thereon are moved by the tubing from said rearward position to said forward position of the cutter during operative intersection of the tubing by the cutter.

10. Apparatus according to claim 9, wherein the cutter is mounted on the rib.

11. Apparatus according to claim 9, wherein said at least one rib comprises a plurality of axially spaced ribs.

12. Apparatus according to claim 7, wherein the non-rotatable mounting of the slide member on the lead screw member comprises a splined connection.

13. Apparatus according to claim 7, wherein the return member comprises a helically disposed rib which extends only partially around the slide member, said helically disposed rib being meshingly engageable with the corrugations of the tubing between operative intersections of the tubing by the cutter for movement of the slide member and the cutter mounted thereon from the forward position to the rearward position of the cutter.

14. Apparatus according to claim 7, wherein the return member comprises a coil spring acting between the slide member and the lead screw member for resiliently urging the slide member and the cutter mounted thereon in the direction from the forward position towards the rearward position of the cutter.

15. Apparatus according to claim 7, wherein a portion of the lead screw member is devoid of said screw threading, and the slide member comprises a sleeve slidably and non-rotatably mounted on said portion of the lead screw member.

16. Apparatus according to claim 7, wherein the lead screw member is constituted by two spaced portions thereof, the slide member comprising an insert member disposed between said two portions of the lead screw member and slidably and non-rotatably mounted on said two portions of the lead screw member.

17. A method of perforating tubing, the method comprising the steps of advancing the tubing along an axial path thereof, and simultaneously rotating at least one cutter in a rotary path which is in a plane substantially at right angles to said axial path of the tubing and which intersects the tubing thereby to perforate the tubing by intermittent intersection of the tubing by the cutter, while the cutter is being moved by the tubing in a direction parallel to said axial path from a rearward position to a forward position thereof, and returning the cutter from the forward position to the rearward position between operative intersections of the tubing by the cutter, the tubing being supported and being restrained against rotation thereof about said axial path during intersection of the tubing by the cutter.

18. A method according to claim 17, wherein said advancing of the tubing along said axial path thereof comprises rotatably driving at least one lead screw member which is disposed substantially parallel to said axial path of the tubing and screw threading of which is in meshing engagement with corrugations presented by the tubing.

19. A method according to claim 17, wherein said restraining of the tubing against rotation thereof about said axial path comprises rotating in opposite directions the cutters of at least one pair thereof, the cutters of each pair thereof being synchronized simultaneously to intersect the tubing.

20. A method according to claim 17, wherein said advancing of the tubing along said axial path thereof comprises rotatably driving at least one lead screw member which is disposed substantially parallel to said axial path of the tubing and screw threading of which is in meshing engagement with corrugations presented by the tubing, the cutter which is mounted on a slide member slidably and non-rotatably mounted on the lead screw member for movement of the slide member between said rearward and forward positions of the cutter being rotated with the lead screw member.

21. A method according to claim 20, wherein the, or each cutter intersects the tubing in the valleys between the corrugations.

22. A method according to claim 20, comprising meshingly engaging with the corrugations of the tubing, during the intersection of the tubing by the cutter, at least one circumferentially disposed rib which extends only partially around the slide member, thereby moving the slide member and the cutter mounted thereon from the rearward position to the forward position of the cutter during the intersection of the tubing by the cutter.

* * * * *